(12) United States Patent
Kitayoshi

(10) Patent No.: US 6,188,356 B1
(45) Date of Patent: Feb. 13, 2001

(54) RADIO MONITORING METHOD AND APPARATUS

(75) Inventor: Hitoshi Kitayoshi, Tokyo (JP)

(73) Assignee: Advantest Corporation (JP)

( * ) Notice: Under 35 U.S.C. 154(b), the term of this patent shall be extended for 0 days.

(21) Appl. No.: 09/310,231

(22) Filed: May 12, 1999

(30) Foreign Application Priority Data

May 12, 1998 (JP) .................................................. 10-128769
May 12, 1998 (JP) .................................................. 10-128770

(51) Int. Cl.$^7$ ............................... G01S 3/02; H04B 17/00
(52) U.S. Cl. ........................... 342/451; 342/452; 455/67.6
(58) Field of Search ..................................... 342/451, 452; 455/456, 457, 67.6

(56) References Cited

U.S. PATENT DOCUMENTS 6,070,079  *  5/2000  Kuwahara ............................ 455/456

FOREIGN PATENT DOCUMENTS 08201459    8/1996   (JP) .
09134113    5/1997   (JP) .
11065406    3/1999   (JP) .

* cited by examiner

Primary Examiner—Thomas H. Tarcza
Assistant Examiner—Fred H. Mull
(74) Attorney, Agent, or Firm—Knobbe, Martens, Olson & Bear, LLP

(57) ABSTRACT

A radio monitoring method which can estimate the position of an objective radio wave source with a high degree of accuracy by taking an influence of the geography or objects on the ground into consideration. According to the method, radio wave hologram observation is performed at individual sensor stations to acquire radio wave reconstructed images, and the reconstructed images are compared with results of a computer simulation prepared in advance to determine a candidate position of the radio wave source. The computer simulation is repeated while the position of the radio wave source is successively varied in the proximity of the candidate position to finally determine the position of the radio wave source. Map information is used in the computer simulation to simulate radio wave propagation with an influence of the geography and objects on the ground into consideration. After the position of the radio wave source is determined, an observation point may be set to or in the proximity of the position, and a radio wave photograph observation car may be moved to the observation point to acquire a radio wave photograph through radio wave hologram observation. The radio wave source can be identified from an image on the radio wave photograph.

18 Claims, 6 Drawing Sheets

SENSOR STATION A
(OBSERVED VALUE)

SENSOR STATION B
(OBSERVED VALUE)

SENSOR STATION C
(OBSERVED VALUE)

SENSOR STATION A
(SIMULATED VALUE)

SENSOR STATION B
(SIMULATED VALUE)

SENSOR STATION C
(SIMULATED VALUE)

ESTIMATED DIRECTIVITY OF ANTENNA

RADIO MONITORING METHOD AND APPARATUS

BACKGROUND OF THE INVENTION

1. Field of the Invention

This invention relates to a method of and an apparatus for radio monitoring. More specifically, the present invention relates to a technique for specifying the position of a radio wave source such as an unlicensed radio station in a particular region, monitoring the utilization environment of the radio wave resources and identifying and visualizing a radio wave source when such a radio wave source is found out.

2. Description of the Related Art

Conventionally, in order to search out a radio wave source such as an unlicensed radio station and specify its position, a plurality of sensor stations (radio monitoring facilities) are arranged at different points, and the sensor stations observe incoming directions of the radio wave from the radio wave source by using Yagi-Uda antennas or goniometers. The position of the radio wave source is estimated by plotting the incoming directions at the sensor stations on a map to detect the position of a cross point (see, for example, Herndon H. Jenkins, "Small-Aperture Radio Direction-Finding", Artech House, 1991). In order to actually prosecute an unlicensed radio station, after the position of the unlicensed ratio station is specified in such a manner as described above, it must be determined which apparatus or which object at the position is the actual radiation source of the radio wave as an unlicensed radio station. In this sense, to determine the position on a map or the geographical position of the radio wave source is called specification of the position of the radio wave source, and to identify which object at the position is an actual radio wave source is called identification of the radio wave source.

The conventional method described above assumes that a radio wave from an objective radio wave source propagates straightforwardly along a single path to a sensor station. However, a radio wave from the source is sometimes diffracted or reflected by geographical features or objects on the ground such as buildings and then propagates without advancing straightforwardly. Further, a radio wave from a radio wave source sometimes comes to a sensor station following a plurality of different propagation paths (multipath) by an influence of the geography or objects on the ground. When the position of a radio wave source which is an object of monitoring is estimated based on the conventional method, errors occur in the detection of the incoming direction of the radio wave, and this gives rise to a problem that the position of the radio wave source cannot be estimated with a high degree of accuracy. For example, if the incoming directions of a radio wave are measured at three or more sensor stations, then the plotted incoming directions may not cross at a single point. Where the accuracy in measurement of the position of the radio wave source is not very high, there is another problem that also it is difficult to identify the radio wave source.

With the conventional method, since a horizontal search of an incoming direction is performed without using information with regards to the vertical direction, there is a problem also in that it is difficult to specify such a radio wave source that is located in a room of a high- or medium-rise building. Further, with the conventional method, a result of measurement obtained is a field strength at a location of a sensor at which the radio wave is received, and if a different radio station which operates with the same frequency is present, then the sensor may receive the objective radio wave combined with the radio wave from the different radio station. Accordingly, the conventional method also has a problem in that the result of measurement cannot be treated easily as objective numerical data for the transmission power of the radio wave source.

The aim of radio monitoring is not only finding out of an unlicensed radio station but also to provide better utilization environment of radio wave resources by investigating whether or not radio wave interference occurs or a cause of such radio wave interference. In order to investigate a cause of radio wave interference, it is effective to find a propagation path from a radio wave source and a field strength distribution. However, the conventional method described above has a problem also in that it cannot determine how a radio wave from a radio wave source propagates to a sensor station nor determine a field strength distribution of the radio wave from the radio wave source irrespective of whether or not the radio wave source is a radio station which operates legally or is an unlicensed radio station.

SUMMARY OF THE INVENTION

It is an object of the present invention to provide a method which can estimate the position of an objective radio wave source in radio monitoring with a high degree of accuracy by taking an influence of the geography or objects on the ground into consideration.

It is another object of the invention to provide an apparatus which can estimate the position of an objective radio wave source in radio monitoring with a high degree of accuracy by taking an influence of the geography or objects on the ground into consideration.

It is a further object of the present invention to provide a method by which the directivity of a transmission antenna at a radio wave source can be estimated and the power distribution of a radio wave from the radio wave source can be displayed in an easily recognizable manner.

It is a still further object of the present invention to provide an apparatus by which the directivity of a transmission antenna at a radio wave source can be estimated and the power distribution of a radio wave from the radio wave source can be displayed in an easily recognizable manner.

It is a yet further object of the present invention to provide a method by which a radio wave source such as an unlicensed radio station can be identified accurately and the transmission power of the radio wave source can be evaluated objectively.

It is a yet further object of the present invention to provide an apparatus by which a radio wave source such as an unlicensed radio station can be identified accurately and the transmission power of the radio wave source can be evaluated objectively and which can actually move to acquire a radio wave photograph.

The first object of the present invention is achieved by a wide area radio monitoring method for monitoring a radio wave from a radio wave source in an area, comprising the steps of disposing one or more sensor stations, calculating, for each of a plurality of points in the area, incoming directions of the radio wave at each of the sensor stations when it is assumed that a radio wave source is present at the point by a computer simulation in which map information is utilized, observing the incoming directions of the radio wave from the radio wave source at the sensor stations separately for individual propagation paths, comparing the observed incoming directions of the radio wave with results of the computer simulation to find, from within the results of the computer simulation, that result which indicates incoming directions having highest similarity to the observed incoming directions of the radio wave and discriminating a corresponding point to the found out result as a candidate position, and performing a computer simulation while the position of the radio wave source is successively adjusted on the consumption that the radio wave source is present around the candidate position to determine the position of the radio wave source.

With the method described above, by utilizing map information to perform a computer simulation, estimation of incoming paths of a radio wave can be performed with the fact taken into consideration that the radio wave may possibly propagate but not straightforwardly by an influence of the geography or objects on the ground. Further, by observing the incoming directions and the intensities of the radio wave separately for the individual propagation paths at each of the sensor stations, the antenna directivity and the transmission power of the radio wave source and reflection and/or diffraction points on the geography can be presumed. Furthermore, by calculating and reconstructing a radio intensity distribution, a radio wave power map can be produced. In order to observe components for the individual propagation paths separately from one another, it is preferable to perform radio wave hologram observation at the individual sensor stations and then determine the incoming directions and the intensities from radio wave reconstructed images obtained by the radio wave hologram observation.

The second object of the present invention is achieved by a wide area radio monitoring apparatus for monitoring a radio wave from a radio wave source in an area, comprising a simulation apparatus for executing a computer simulation of radio wave propagation based on map information, one or more sensor stations for observing incoming directions of the radio wave from the radio wave source, and direction finding trace chart production means for causing the simulation apparatus to execute a computer simulation while a position of the radio wave source is successively varied so that the incoming directions at the sensor stations by the computer simulation may have highest similarity to the incoming directions at the sensor stations by the observation to determine the position of the radio wave source and tracing propagation paths of the radio wave by the computer simulation by the simulation apparatus.

The further object of the present invention is achieved by a field traveling type radio wave photography method for searching a radio wave source and acquiring an image of the radio wave source from neighborhood of the radio wave source, comprising the steps of measuring incoming directions of the radio wave from the radio wave source at a plurality of sensor stations, determining the position of an observation point based on the measured incoming directions, moving to the observation point and performing radio wave hologram observation at the observation point, and obtaining a radio wave photograph image of the radio wave source based on the radio wave hologram observation.

The still further object of the present invention is achieved by a field traveling type radio wave photography apparatus for searching a radio wave source and acquiring an image of the radio wave source from neighborhood of the radio wave source, comprising a plurality of sensor stations having known positions for detecting the radio wave from the radio wave source to measure incoming directions of the radio wave from the radio wave source, observation point determining means for determining a position of an observation point based on the incoming directions of the radio wave, a vehicle capable of moving to the determined observation point, and radio wave hologram observation means provided on the vehicle for performing radio wave hologram observation.

The above and other objects, features, and advantages of the present invention will be apparent from the following description referring to the accompanying drawing which illustrate examples of preferred embodiments of the present invention.

DESCRIPTION OF THE PREFERRED EMBODIMENTS

Figure 1:
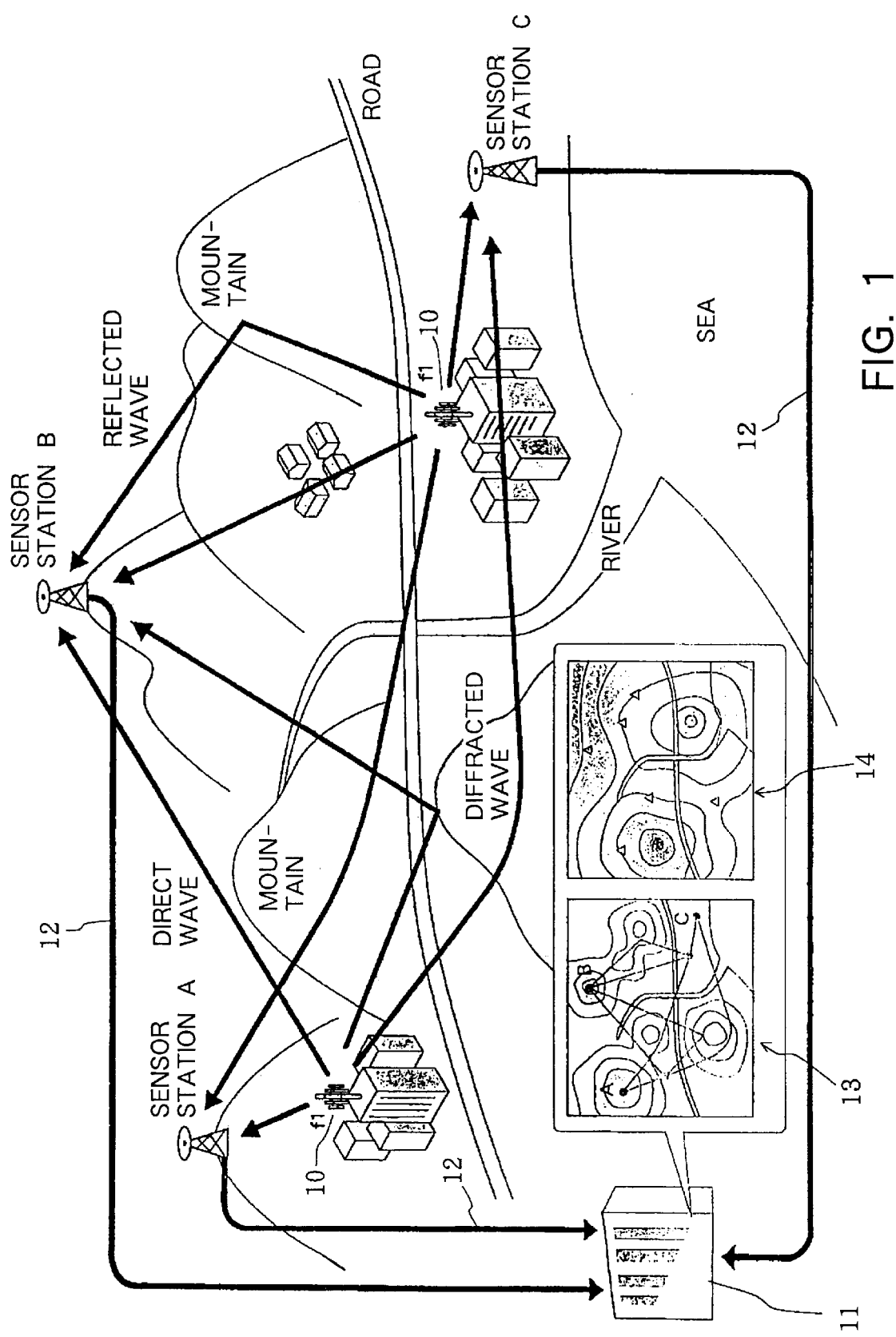
FIG. 1 is a schematic view illustrating a concept of wide area radio monitoring according to a first embodiment of the present invention.

An outline of wide area radio monitoring according to the first embodiment of the present invention is described with reference to FIG. 1. Here, it is assumed that radio wave source 10 radiates a radio wave of frequency f1. In order to perform radio monitoring in a surveillance area, sensor stations (monitoring stations) A to C are disposed and connected to center station 11 over lines 12.

A radio wave from radio wave source 10 propagates to sensor stations A to C. However, by influence from a mountain or some other object on the ground, in addition to components which directly propagate from the radio wave source to the sensor stations, that is, direct waves, components which propagate while being diffracted, that is, diffracted waves, and components which propagate while being reflected, that is, reflected waves, are involved. In the present embodiment, in order for each sensor station A to C to separate components for different propagation paths from each other and determine the incoming directions and their intensities, each sensor station A to C performs radio wave hologram observation to reconstruct a radio wave image. However, if components for individual propagation paths can be separated from and observed independently of each other, then any other conventional direction finding technique may be used without depending upon radio wave hologram observation.

Since also a radio wave is a kind of wave motion, radio wave hologram observation can be performed similarly as in the case of a hologram of light, and a radio wave reconstructed image is obtained by reconstructing a radio wave hologram and a wave source distribution or intensity can be investigated from the radio wave reconstructed image.

Center station 11 prepares several predicted radio wave reconstructed images which are supposed to be obtained at the individual sensor stations by a computer simulation based on geographic data and ground object data in advance, and compares radio wave reconstructed images obtained actually at the sensor stations with the predicted radio wave reconstructed images obtained by the simulation to determine the position of radio wave source 10 and further produce and output direction finding trace chart 13 and radio wave power map 14.

Figure 2:
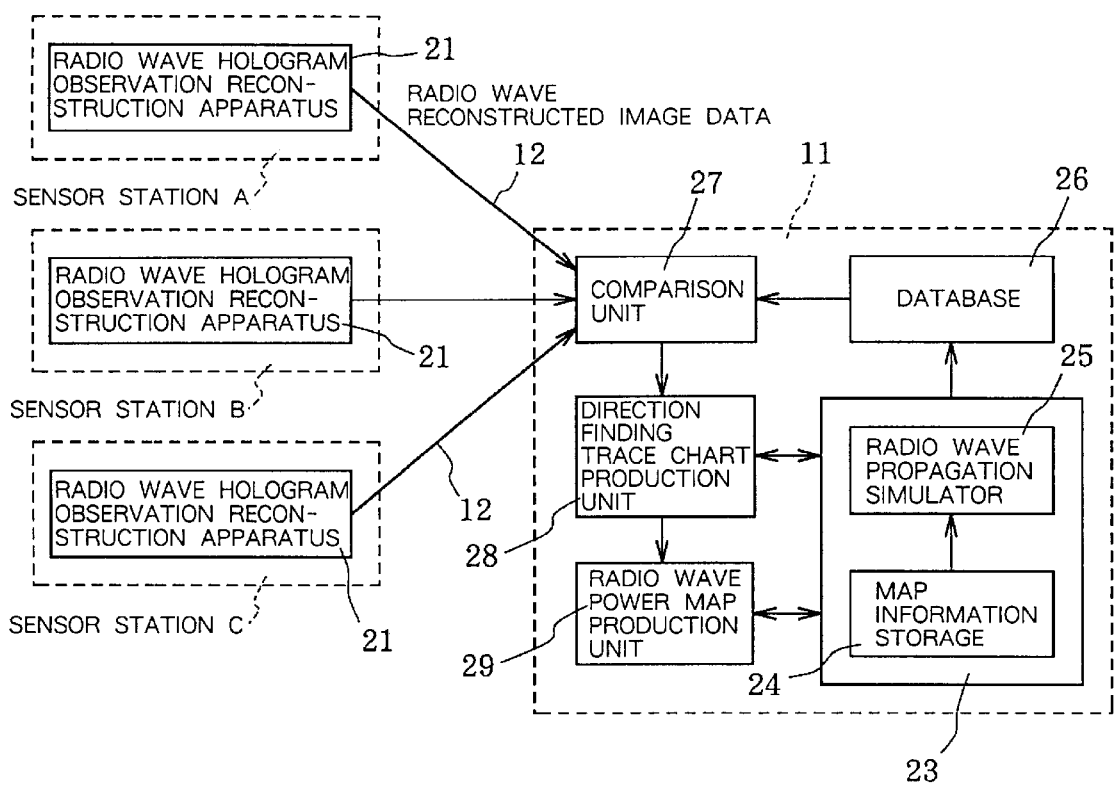
FIG. 2 is a block diagram showing a construction of a wide area radio monitoring apparatus used in the first embodiment.

FIG. 2 shows a construction of a wide area radio monitoring apparatus for performing such wide area radio monitoring as described above. Each of sensor stations A to C includes radio wave hologram observation reconstruction apparatus 21 which performs radio wave hologram observation and outputs a resulting radio wave reconstructed image. Radio wave hologram observation reconstruction apparatus 21 includes, for example, a fixed antenna and a scanning antenna which scans a scanning observation plane, and correlates a reception signal by the fixed antenna with another reception signal by the scanning antenna in a predetermined observation frequency to determine complex correlation values at several points of the scanning observation plane. The two-dimensional arrangement of the complex correlation values is a two-dimensional complex interferogram. Then, radio wave hologram observation reconstruction apparatus 21 reconstructs the two-dimensional complex interferogram to obtain a radio wave reconstructed image. For this radio wave hologram observation reconstruction apparatus 21, a radio wave hologram observation reconstruction apparatus disclosed in Japanese Patent Laid-Open No. 201459/1996 (JP, 08201459, A) or No. 134113/1997 (JP, 09134113, A) by the inventor of the present invention or another radio wave hologram observation reconstruction apparatus disclosed in Japanese Patent Laid-Open No. 65406/1999 (JP, 11065406, A) can be employed.

While three sensor stations A to C are provided here, the number of sensor stations is not limited to three. The number of sensor stations may be one or two or may be equal to or larger than four.

Center station 11 includes simulation apparatus 23 for simulating radio wave propagation or a radio wave reconstructed image by means of a computer, database 26 for storing results of a simulation performed by simulation apparatus 23 in advance, comparison unit 27 for comparing radio wave reconstructed images observed by sensor stations A to C with radio wave reconstructed images obtained by the simulation, direction finding trace chart production unit 28 for determining the position of a radio wave source and producing and outputting a direction finding trace chart, and radio wave power map production unit 29 for producing and outputting a radio wave power map. Simulation apparatus 23 includes map information storage 24 in which map information, i.e., information regarding a map and the geography and objects on the ground, is stored, and radio wave propagation simulator 25 which refers to the map information to perform a simulation of radio wave propagation on the assumption that a radio wave source is present at a certain point on the map.

Thanks to a progress of a geographical information system (GIS) in recent years, it has become possible to easily obtain map information required by radio wave propagation simulator 25. Radio wave propagation simulator 25 is actually composed of a computer, and uses, for example, a ray trace method (IEEE Network Magazine, pp. 27–30, November, 1991) or a moment method (R. F. Harrington, "Field Computation by Moment Methods", IEEE Press, 1993) to calculate a field intensity distribution which appears when a transmitting station (radio wave source) having an arbitrary directivity is present at a point on a map and determine incoming directions and intensities of a radio wave at the positions of the sensor stations to simulate a radio wave reconstructed image.

The simulation results stored in advance in database 26 are results of a simulation obtained when the surveillance area is divided into meshes of, for example, an interval of 300 m and radio wave reconstructed images which are presupposed to be observed at sensor stations A to C where a transmitting station having a omnidirectional antenna is disposed at a mesh point of the meshes are determined for the individual mesh points by simulation apparatus 23.

Comparison unit 27 compares the radio wave reconstructed images by the simulation stored in database 26 and radio wave reconstructed images obtained by radio wave hologram observation by sensor stations A to C with each other to find, from among the radio wave reconstructed images in database 26, that radio wave reconstructed image which has the highest similarity to the radio wave reconstructed images obtained by the observation and determines the position of a mesh point corresponding to the found radio wave reconstructed image obtained by the simulation. For the comparison in similarity, an ordinary technique of pattern matching can be used, and, for example, if the maximum level of the radio wave in the radio wave reconstructed image is 0 dB, then comparison unit 27 uses a technique of comparing patterns of those portions whose radio wave levels are higher than −40 dB to determine a correlation coefficient as a graphic form. At this point of time, however, since the antenna directivity of the radio wave source is not known, attention is paid principally to the incoming directions of the radio wave to find a radio wave reconstructed image which has a high similarity.

Direction finding trace chart production unit 28 assumes that a transmission station (or radio wave source) is present around the mesh point found by the processing of comparison unit 27, causes simulation apparatus 23 to execute a computer simulation of radio wave propagation when further fine adjustment of the position is performed, and compares the radio wave reconstructed images according to the results of the observation and a radio wave reconstructed image obtained by the simulation when the fine adjustment of the position is performed to determine a position of the radio wave source having a higher degree of similarity. Then, direction finding trace chart production unit 28 performs tracing of radio wave propagation paths from the thus determined radio wave source position to sensor stations A to C to produce a direction finding trace chart and outputs it, and then estimates the antenna directivity at the radio wave source based on a result of the tracing. The direction finding trace chart and the estimate of the antenna directivity will be hereinafter described.

Radio wave power map production unit 29 causes simulation apparatus 23 to execute a computer simulation of radio wave propagation based on the position of the radio wave source and the result of the estimate of the antenna directivity of the radio wave source determined by direction finding trace chart production unit 28, calculates a field intensity distribution of the radio wave from the radio wave source on the map and displays and/or prints out the field intensity distribution as a radio wave power map corresponding to the radio wave source. For the technique for displaying the radio wave power map, a method of changing the color tone in accordance with the field intensity, another method which employs contour lines, a further method which employs a combination of these two methods, and so forth are available.

Figure 3:
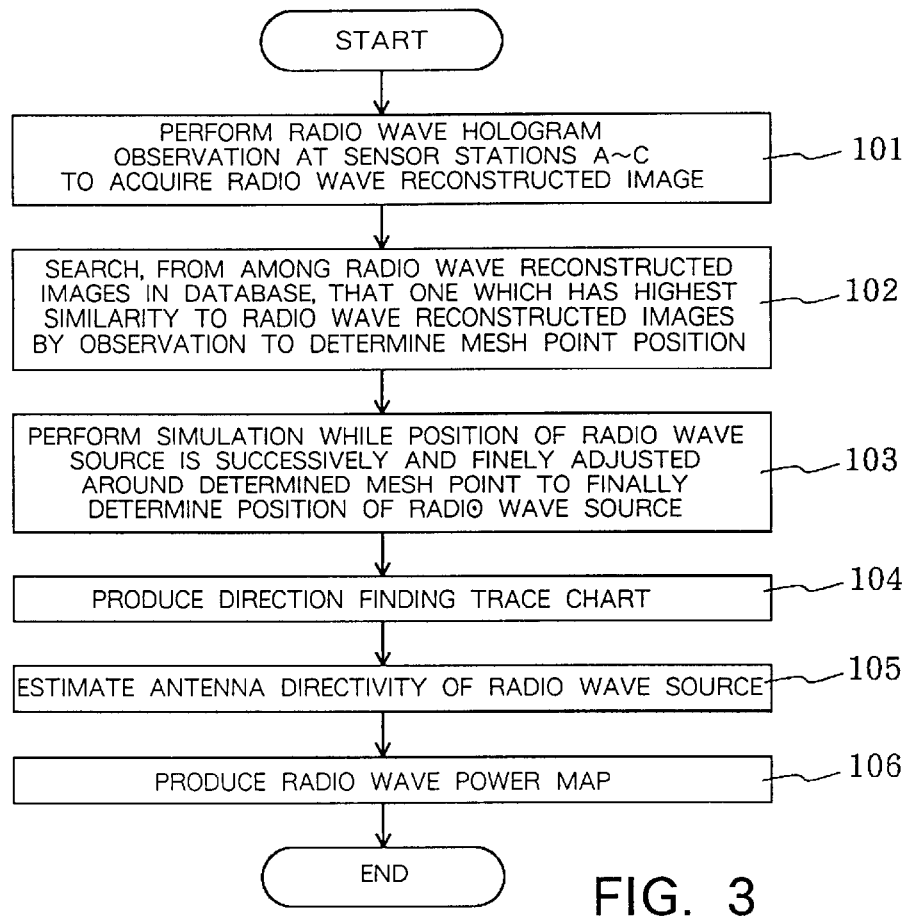
FIG. 3 is a flow chart illustrating a procedure for performing wide area radio monitoring in which the apparatus shown in FIG. 2 is used.

The processing by the wide area radio monitoring apparatus of the first embodiment described above can be summarized as illustrated in the flow chart of FIG. 3. Here, it is assumed that results of each computer simulation performed on the assumption that a radio wave source is present on a mesh cross point on a map is stored in advance in database 26.

First in step 101, radio wave hologram observation is performed at sensor stations A to C to acquire radio wave reconstructed images, and in step 102, comparison unit 27 searches, from among the radio wave reconstructed images according to the simulation in database 26, a radio wave reconstructed image which is most similar to the radio wave reconstructed images obtained by the actual observation, and determines the position of a mesh point corresponding to the radio wave reconstructed image as a candidate position for the radio wave source. Then, the control is handed over to direction finding trace chart production unit 28, and in step 103, direction finding trace chart production unit 28 performs a computer simulation while successively and finely adjusting the position of the radio wave source around the mesh point of the candidate position to finally determine the position of the radio wave source. Direction finding trace chart production unit 28 further performs tracing of radio wave propagation paths in step 104 based on the thus determined position of the radio wave source, and estimates the directivity of the transmission antenna of the radio wave source in step 105. Finally, the control is transferred to radio wave power map production unit 29, and radio wave power map production unit 29 determines a field intensity distribution on the map to produce a radio wave power map and outputs it in step 106.

Since the processing described above can be applied not only to a single radio wave source but also to a plurality of radio wave sources, with the wide area radio monitoring method described here, a cover area of or an interference situation of each of a plurality of radio wave sources (transmission stations) can be monitored on a map.

Figure 4:
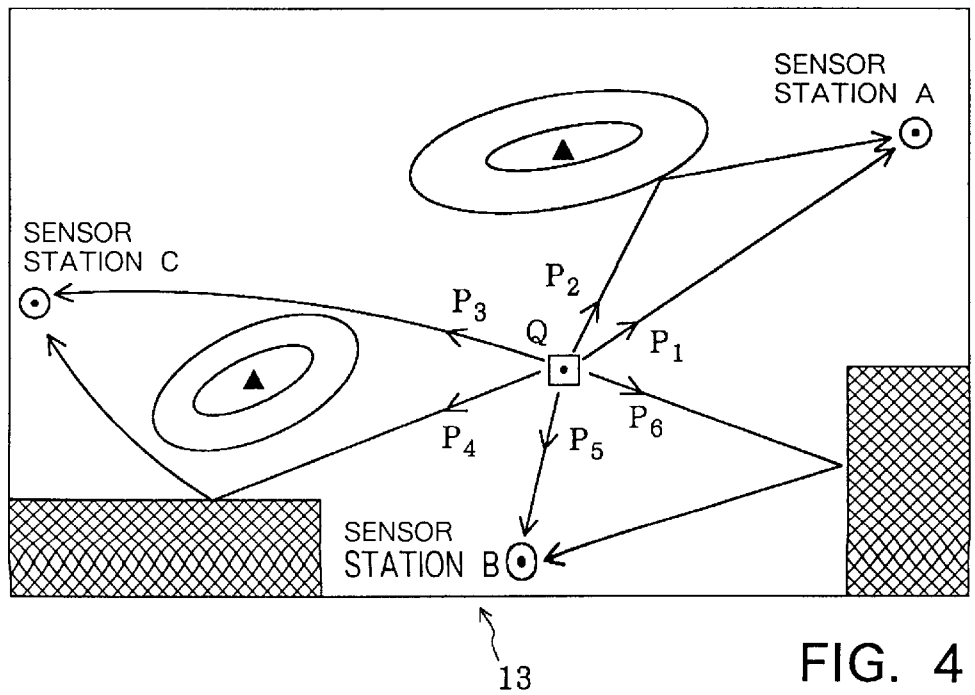
FIG. 4 is a view showing an example of a direction finding trace chart.

Now, details of a direction finding trace chart is described. FIG. 4 shows an example of a direction finding trace chart.

In direction finding trace chart 13 shown, a radio wave source (i.e., assumed transmission station) is present at point Q, and propagation paths of a radio wave from the radio wave source are indicated by arrow marks. In FIG. 4, a triangular mark and contours indicate a mountain, and hatching lines indicate an object on the ground. From direction finding trace chart 13 shown, it can be seen that a radio wave from the radio wave source propagates as a direct wave ($P_1$) and a reflected wave ($P_2$) by a mountain to sensor station A, propagates as a direct wave ($P_5$) and a reflected wave ($P_6$) by an object on the ground to sensor station B, and propagates as a diffracted wave ($P_3$) by a mountain and a reflected wave ($P_4$) by an object on the ground to sensor station C. While a two-dimensional direction finding trace chart is described here, it is also possible to alternatively perform tracing of radio wave propagation paths three-dimensionally and display and/or output them.

Next, estimate of the directivity of a transmission antenna of a radio wave source is described with reference to FIGS. 5A, 5B, 5C, 6A, 6B, 6C and 7.

Figure 5A:
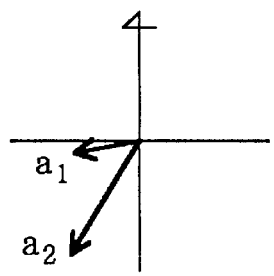
FIGS. 5A to 5C are diagrammatic views illustrating an example of amplitudes of a radio wave for different propagation paths by observation at sensor stations A to C, respectively, where estimation of the directivity of a transmission antenna of a radio wave source is performed.
Figure 5B:
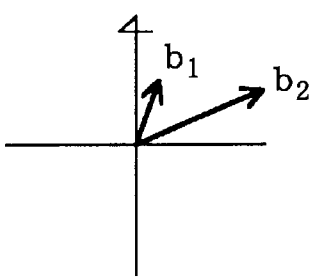
Figure 5C:
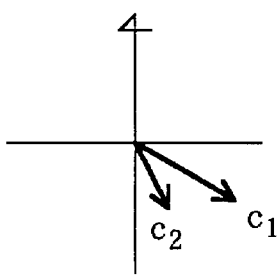
Figure 6A:
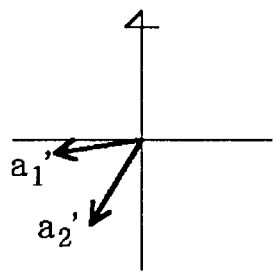
FIGS. 6A to 6C are diagrammatic views illustrating an example of amplitudes of a radio wave for different propagation paths at sensor stations A to C, respectively, when, where estimation of the directivity of a transmission antenna of a radio wave source is performed, a simulation is performed under the assumption that the transmission antenna is a omnidirectional antenna.
Figure 6B:
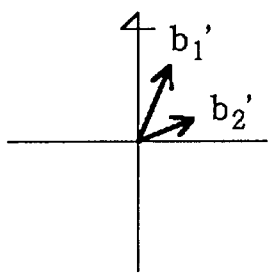
Figure 6C:
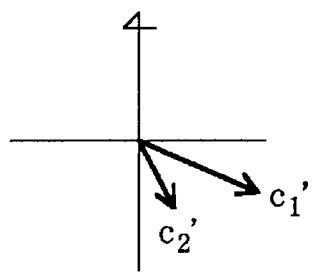
Figure 7:
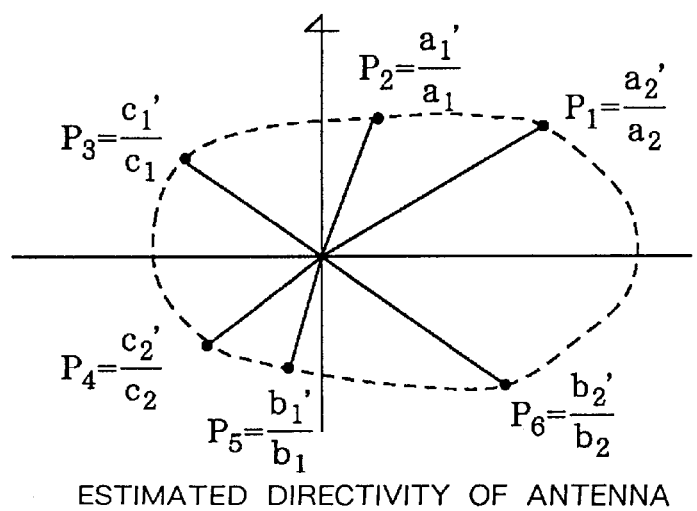
FIG. 7 is a diagrammatic view illustrating the directivity of the transmission antenna estimated based on the results illustrated in FIGS. 5A to 5C and 6A to 6C.

From radio wave reconstructed images observed by sensor stations A to C, the incoming direction and the intensity of the radio wave for each propagation path are extracted. FIGS. 5A to 5C illustrate amplitudes of the radio wave observed at sensor stations A to C, respectively. The direction of each thick arrow mark indicates the incoming direction of the radio wave from the propagation path, and the length of the arrow mark indicates the amplitude of the radio wave. In the example shown, the amplitudes for the individual propagation paths are $a_1$, $a_2$, $b_1$, $b_2$, $c_1$, $c_2$. On the other hand, a simulation of radio wave propagation is performed by simulation apparatus 23 on the assumption that a omnidirectional transmission antenna is present at the position of the radio wave source determined already and the radio wave is radiated from the transmission antenna to determine the amplitudes of the radio wave at sensor stations A to C for the individual propagation paths. FIGS. 6A to 6C indicate the amplitudes of the radio wave by the simulation at sensor stations A to C, respectively, and the amplitudes for the individual propagation paths are $a_1'$, $a_2'$, $b_1'$, $b_2'$, $c_1'$, $c_2'$. Then, by dividing the amplitudes obtained by the observation by the amplitudes obtained by the simulation for individual propagation paths $P_1$, $P_2$, $P_3$, $P_4$, $P_5$, $P_6$, the directivity of the transmission antenna in the directions of the propagation paths at the position of the radio wave source can be determined. In FIG. 7, a dark spot indicates the directivity of the antenna in the direction of each propagation path. Then, a directivity characteristic in an arbitrary direction can be calculated by performing interpolation calculation with a presumed type of the antenna and so forth taken into consideration. A broken line curve of FIG. 7 indicates a directivity characteristic calculated in this manner.

In the estimate of the directivity of the transmission antenna described above, an omnidirectional antenna may not be assumed in the simulation, but alternatively, a directivity such as, for example, a dipole characteristic may be assumed, and the directivity of the transmission antenna may be estimated as a displacement from the assumed directivity from a ratio between an observed amplitude and an amplitude obtained by the simulation. Further, while, in the example described above with reference to FIGS. 5A, 5B, 5C, 6A, 6B, 6C and 7, the incoming directions and the directivities of the radio wave are handled in a plane or two-dimensionally, the three-dimensional directivity may be estimated by handling three-dimensional incoming directions of a radio wave.

With the method of the present embodiment, since the incoming directions of a radio wave for individual propagation paths are observed separately from one another at sensor stations and results of the observation are combined with results of a computer simulation of radio wave propagation performed with the geography or objects on the ground taken into consideration, even if the assumption of straightforward advancement of a radio wave is not reasonable or diffraction and/or reflection are involved, the position of the radio wave source can be determined accurately. Further, the propagation paths of the radio wave from the radio wave source to the sensor stations can be traced by using a computer simulation, and the directivity of the transmission antenna of the radio wave source can be estimated. Furthermore, from them, a field intensity distribution of the radio wave from the radio wave source can be estimated, and the utilization environment of radio wave can be monitored appropriately.

Next, a second embodiment of the present invention is described. Here, a procedure is described wherein, after the position of a radio wave source is discriminated, an observation point is set to or around the position of the radio wave source and a radio wave photograph observation car travels to the location of the observation point to identify the radio wave source. The position of the radio wave source can be specified by the method described in connection with the first embodiment above. In the present embodiment, however, since it is not necessary for the observation point to strictly coincide with the position of the radio wave source, the observation point may alternatively be set by another method as hereinafter described.

Figure 8:
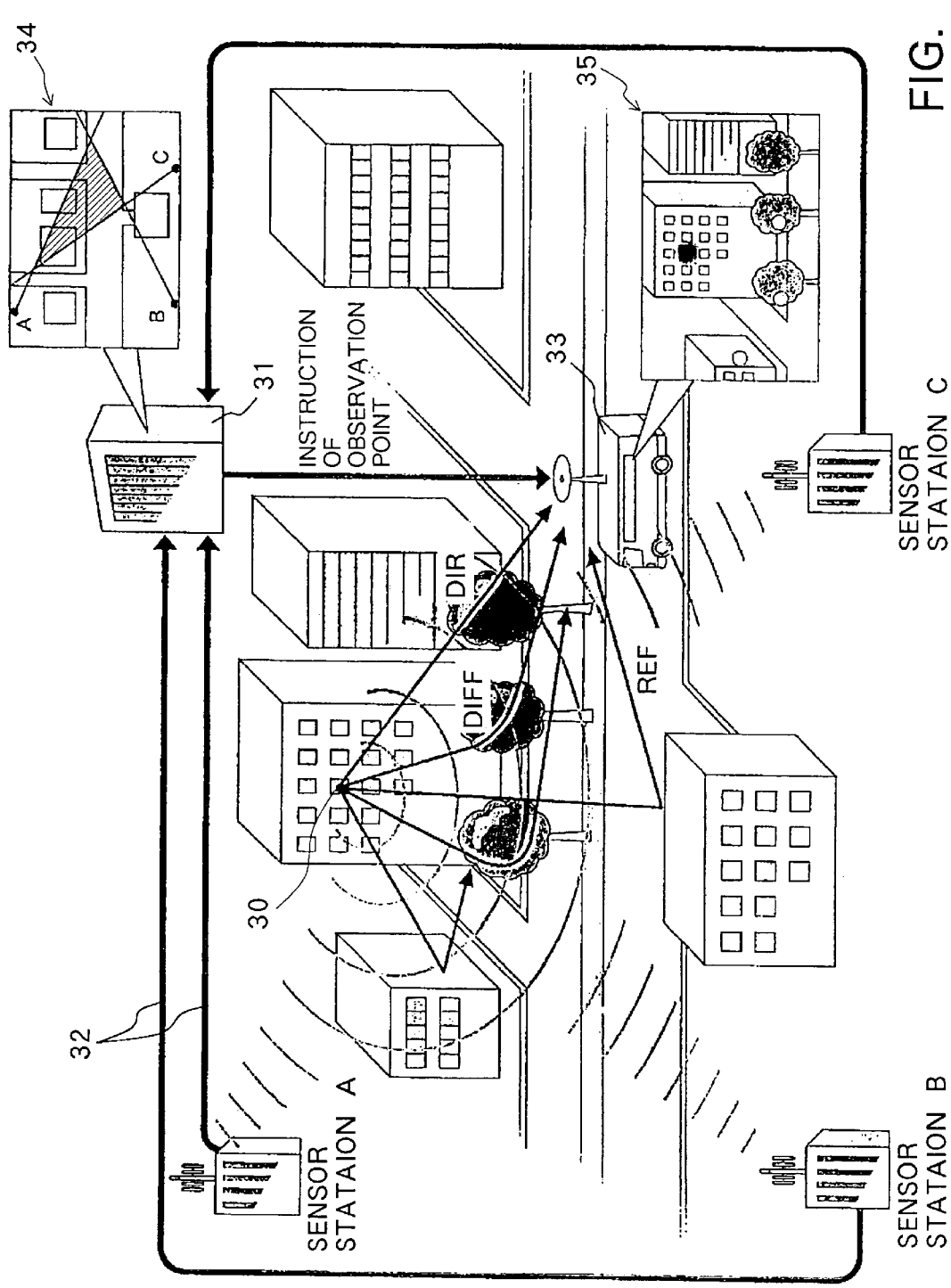
FIG. 8 is a schematic view illustrating a concept of radio monitoring according to a second embodiment of the present invention.

An outline of the radio monitoring described here is described with reference to FIG. 8. Here, it is assumed that unlicensed radio station 30 in a room of a high- or medium-rise building is a radio wave source, and identification of this unlicensed radio station 30 and evaluation of the transmission power are performed.

In order to perform radio monitoring in a surveillance area to determine a rough position of the radio wave source (i.e., unlicensed radio station 30), a plurality of sensor stations are disposed at known points. In this example, three sensor stations A to C are disposed. Each of sensor stations A to C determines the incoming directions of a radio wave from unlicensed radio station 30 by means of a Yagi-Uda antenna or a goniometer. Sensor stations A to C are connected to center station 31 over lines 32, and center station 31 collects data of the incoming directions of the radio wave at sensor stations A to C to determine a rough position of unlicensed radio station 30 and determines the position of an observation point to be used for identification of unlicensed radio station 30. The position of the observation point is set, for example, on the assumption that the plotted incoming directions at sensor stations A to C do not cross at one point but cross at three points, to a position from which the region of a triangular area defined by apexes provided by the three points can be overlooked. In FIG. 8, the triangular region is represented as a region of slanting lines in map 34 which indicates the range of search. Else, it is assumed that the incoming directions cross substantially at a single point, and the observation point is set to a position from which the cross point can be overlooked. On the other hand, if the position of the radio wave source is determined based on the method of the first embodiment, then the observation point may be set to or around the position of the radio wave source. In the present embodiment, since it is presupposed that radio wave photograph observation car 33 is dispatched to the site in order to acquire a radio wave photograph, the observation point is preferably set to a point on a road or the like suitable for radio wave photograph observation car 33 to approach.

Center station 31 instructs radio wave photograph observation car 33 to travel to the observation point. In response to the instruction, radio wave photograph observation car 33 travels to the observation point, performs radio wave hologram observation to acquire a radio wave reconstructed image and outputs it as radio wave photograph 35.

Since also a radio wave is a kind of wave motion as described above, hologram observation of radio wave can be performed in a similar manner as in the case of a hologram of light, and a radio wave reconstructed image can be obtained by reconstructing the hologram and a wave source distribution or an intensity can be investigated from the radio wave reconstructed image. In the present embodiment, since a radio wave reconstructed image of a region which includes a radio wave source such as, for example, an unlicensed radio station is acquired as a radio wave photograph, an accurate position and/or intensity of the radio wave source can be determined.

In the example shown, a radio wave from unlicensed radio station 30 is observed at radio wave photograph observation car 33 not only as a direct wave DIR but also as a reflected wave REF reflected by a wall of a building in the neighborhood and a diffracted wave DIFF diffracted by a tree on a street. Here, a radio wave photograph is obtained as a radio wave image indicated in a superposing relationship with an optical image of the background. In this radio wave photograph, the unlicensed radio station in a room of a building is represented as a bright image, which represents a primary generation source of the radio wave, while, corresponding to the diffracted wave DIFF or the reflected wave REF, an apparent incoming direction of the diffracted wave DIFF or the reflected wave REF is represented as a rather bright image, which is an image of a secondary wave source by a multipath. In FIG. 8, the apparent incoming direction of the diffracted wave DIFF or the reflected wave REF is indicated by a dark round mark on a wall of a building or a tree. In the radio wave photograph shown, the position of unlicensed radio station 30 is specified accurately.

Figure 9:
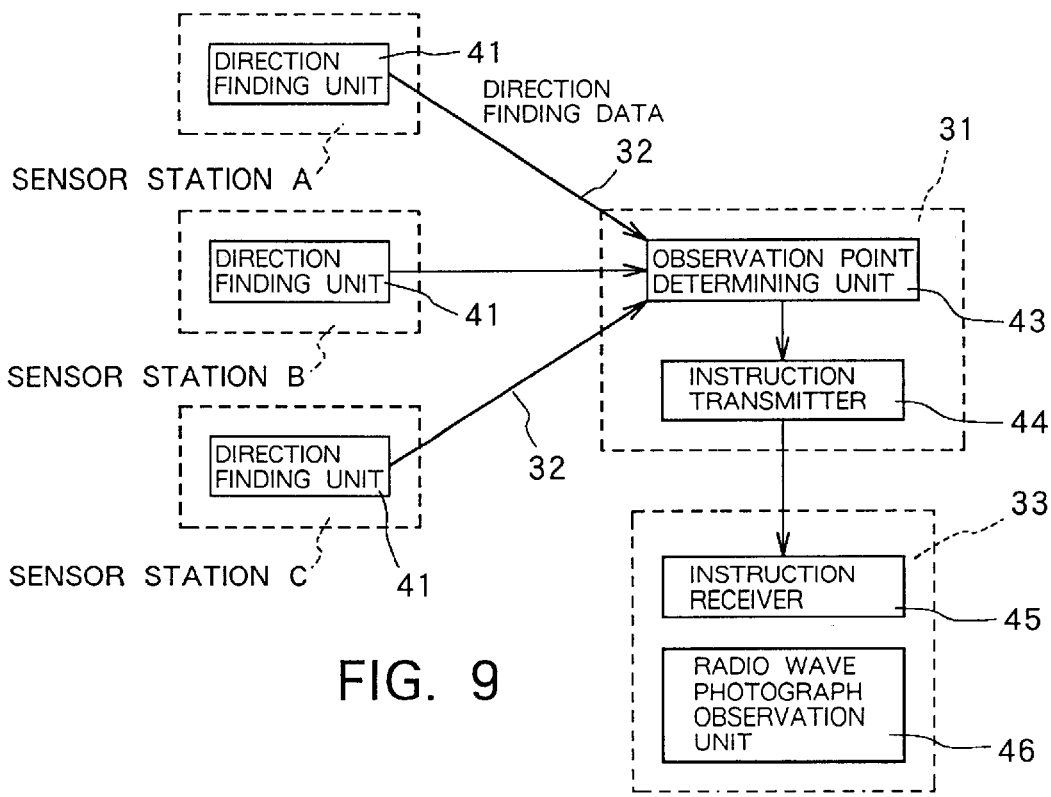
FIG. 9 is a block diagram showing a construction of a field traveling type radio wave photography apparatus used in the second embodiment.

A construction of a field traveling type radio wave photography apparatus preferably used to perform radio monitoring in which such a radio wave photograph as described above is utilized is described with reference to FIG. 9.

As described above, the field traveling type radio wave photography apparatus is roughly composed of center station 31, a plurality of sensor station A to C connected to center station 31 over lines 32, and radio wave photograph observation car 33. Each of sensor stations A to C includes direction finding unit 41 which determines incoming directions of a radio wave from a radio wave generation source of an object of monitoring by means of a Yagi-Uda antenna or a goniometer and outputs the determined incoming direction as direction finding data. Center station 31 includes observation point determining unit 43 which determines the position of the observation point based on the direction finding data of sensor stations A to C, and instruction transmitter 44 which instructs radio wave photograph observation car 33 of the determined observation point by wireless. Radio wave photograph observation car 33 includes instruction receiver 45 for receiving the instruction from center station 31, and radio wave photograph observation unit 46 for performing radio wave hologram observation to reconstruct a hologram image and outputting the reconstructed hologram image as a radio wave photograph. For radio wave photograph observation unit 46, a radio wave photograph observation unit similar to the radio wave hologram observation reconstruction apparatus in the first embodiment can be used, and also an apparatus which employs cylindrical scanning or an arbitrary curved face scanning method can be used.

Figure 10:
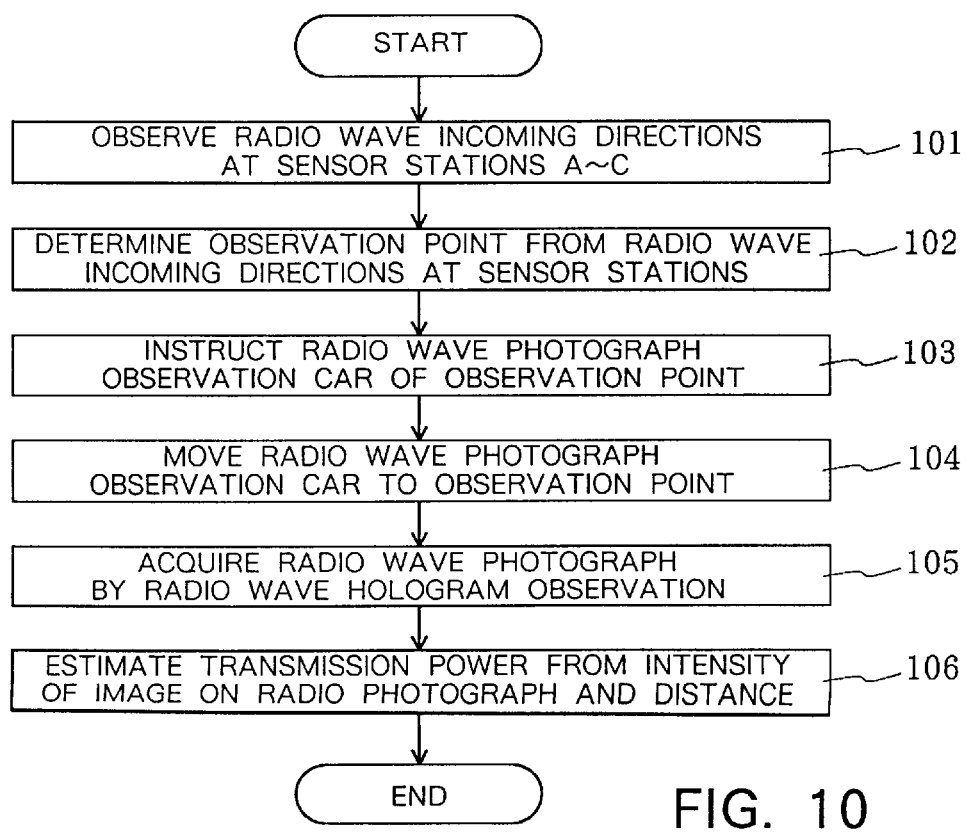
FIG. 10 is a flow chart illustrating a procedure for identification of a radio wave source in which the apparatus shown in FIG. 9 is used.

Next, a procedure of identifying a radio wave source in the present embodiment is described with reference to the flow chart of FIG. 10. First in step 111, each sensor station A to C observes incoming directions of a radio wave, and in step 112, observation point determination unit 43 determines the position of an observation point based on data of the incoming directions of the radio wave. Then in step 113, instruction transmitter 44 instructs radio wave photograph observation car 33 of the observation point by wireless, and in step 114, radio wave photograph observation car 33 travels to the instructed observation point. Then in step 115, radio wave photograph observation car 33 performs radio wave hologram observation at the instructed observation point to acquire a radio wave photograph. Then in step 116, the transmission power of the radio wave source is estimated in the following manner.

The intensity or brightness of a radio wave image on a radio wave photograph increases in proportion to field strength E at an observation point of a radio wave radiated from each radio wave source. Accordingly, from intensity E of the radio wave image and distance r between a building or the like corresponding to the radio wave image and the observation point, transmission power W of each radio wave source can be estimated as $$W \approx k(E \cdot r)^2 \qquad (1)$$

where k is a constant.

By the processing described above, a radio wave source can be identified accurately and an objective evidence of the fact of emission of a radio wave can be obtained.

While the second embodiment of the present invention is described above, the second embodiment can be modified further. For example, incoming direction finding information or direction finding data received by the sensor stations may not be sent to the center station, but may be sent directly to the radio wave photograph observation car so that the observation point may be determined by the radio wave photograph observation car itself. Further, while the positions of the sensor stations must be known, the sensor stations need not be formed as fixed stations. If the position information of the sensor stations and the incoming direction finding information are obtained, then the sensor stations may be movable. In this instance, the radio wave photograph observation car itself may be formed as a sensor station.

It is to be understood that variations and modifications of the radio monitoring method and apparatus disclosed herein will be evident to those skilled in the art. It is intended that all such modifications and variations be included within the scope of the appended claims.

What is claimed is:

1. A wide area radio monitoring method for monitoring a radio wave from a radio wave source in an area, comprising the steps of:
   disposing one or more sensor stations;
   calculating, for each of a plurality of points in the area, incoming directions of the radio wave at each of said sensor stations when it is assumed that a radio wave source is present at the point by a computer simulation in which map information is utilized;
   observing the incoming directions of the radio wave from said radio wave source at said sensor stations separately for individual propagation paths;
   comparing the observed incoming directions of the radio wave with results of the computer simulation to find, from within the results of the computer simulation, that result which indicates incoming directions having highest similarity to the observed incoming directions of the radio wave and discriminating a corresponding point to the found out result as a candidate position; and
   performing a computer simulation while a position of said radio wave source is successively adjusted on an assumption that said radio wave source is present around the candidate position to determine the position of said radio wave source.

2. A wide area radio monitoring method according to claim 1, further comprising a step of executing a simulation of radio wave propagation with said radio wave source disposed at the determined position to perform tracing of propagation paths.

3. A wide area radio monitoring method according to claim 2, wherein, together with the incoming directions of the radio wave, also the intensity of the radio wave is observed for each of the incoming directions at each of said sensor stations, and further comprising a step of comparing, after the tracing of propagation paths is executed, the observed amplitudes for the individual propagation paths at said sensor stations and the amplitudes obtained by the computer simulation for the individual propagation paths at said sensor stations with each other to estimate an antenna directivity of said radio wave source.

4. A wide area radio monitoring method according to claim 3, wherein the estimated antenna directivity and the observed amplitudes for the individual propagation paths at said sensor stations are utilized to calculate a field intensity distribution of the radio wave from said radio wave source in a predetermined area.

5. A wide area radio monitoring method according to claim 1, wherein the incoming directions of the radio wave are determined by radio wave hologram observation at said sensor stations.

6. A wide area radio monitoring method according to claim 1, further comprising the steps of:
   setting an observation point at or around the determined position;
   moving to the observation point and performing radio wave hologram observation at the observation point; and
   obtaining a photograph image of said radio wave source based on the radio wave hologram observation.

7. A wide area radio monitoring method according to claim 2, wherein the incoming directions of the radio wave are determined by radio wave hologram observation at said sensor stations.

8. A wide area radio monitoring apparatus for monitoring a radio wave from a radio wave source in an area, comprising:
   a simulation apparatus for executing a computer simulation of radio wave propagation based on map information;
   one or more sensor stations for observing incoming directions of the radio wave from said radio wave source; and
   direction finding trace chart production means for causing said simulation apparatus to execute a computer simulation while a position of said radio wave source is successively varied so that the incoming directions at said sensor stations by the computer simulation may have highest similarity to the incoming directions at said sensor stations by the observation to determine the position of said radio wave source and tracing propagation paths of the radio wave by the computer simulation by said simulation apparatus.

9. A wide area radio monitoring apparatus according to claim 8, further comprising:
   a database in which, for each of a plurality of points in the area, results of a computer simulation executed by said simulation apparatus to simulate the incoming directions of the radio wave at said sensor stations when it is assumed that said radio wave source is present at the point are stored; and comparison means for searching, from among the results in said database, that result which has highest similarity to the incoming directions by the observation at said sensor stations and determining a corresponding point to the found result as a candidate position;

said direction finding trace chart production means varying the position of said radio wave source around the candidate position.

10. A wide area radio monitoring apparatus according to claim 8, wherein each of said sensor stations observes also intensity of the radio wave for each of the incoming directions, and said direction finding trace chart production means compares the observed amplitudes for the individual propagation paths at said sensor stations and the amplitudes obtained by the computer simulation for the individual propagation paths at said sensor stations with each other to estimate an antenna directivity of said radio wave source.

11. A wide area radio monitoring apparatus according to claim 10, further comprising radio wave power map production means for utilizing the estimated antenna directivity to calculate a field intensity distribution of the radio wave from said radio wave source in a predetermined area and outputting the calculated field intensity distribution as a radio wave power map.

12. A wide area radio monitoring apparatus according to claim 8, wherein the incoming directions of the radio wave are determined by radio wave hologram observation at each of said sensor stations.

13. A wide area radio monitoring apparatus according to claim 9, wherein the incoming directions of the radio wave are determined by radio wave hologram observation at each of said sensor stations.

14. A field traveling type radio wave photography method for searching a radio wave source and acquiring an image of said radio wave source from neighborhood of said radio wave source, comprising the steps of:

measuring incoming directions of the radio wave from said radio wave source at a plurality of sensor stations;

determining a position of an observation point based on the measured incoming directions;

moving to the observation point and performing radio wave hologram observation at the observation point; and obtaining a radio wave photograph image of said radio wave source based on the radio wave hologram observation.

15. A field traveling type radio wave photography method as claimed in claim 14, wherein transmission power of said radio wave source is estimated together with the acquisition of the radio wave photograph of said radio wave source.

16. A field traveling type radio wave photography method as claimed in claim 14, wherein the radio wave photograph image is displayed in a superposing relationship with an optical photograph image imaged at the observation point.

17. A field traveling type radio wave photography apparatus for searching a radio wave source and acquiring an image of said radio wave source from neighborhood of said radio wave source, comprising:

a plurality of sensor stations having known positions for detecting the radio wave from said radio wave source to measure incoming directions of the radio wave from said radio wave source;

observation point determining means for determining a position of an observation point based on the incoming directions of the radio wave;

a vehicle capable of moving to the determined observation point; and radio wave hologram observation means provided on said vehicle for performing radio wave hologram observation.

18. A field traveling type radio wave photography apparatus as claimed in claim 17, further comprising a center station connected to said sensor stations over lines and including said observation point determining means, said center station including an instruction transmitter for transmitting an instruction of the observation point to said vehicle, said vehicle including an instruction receiver for receiving the instruction.

* * * * *